United States Patent [19]

Sydansk

[11] Patent Number: 4,494,606
[45] Date of Patent: Jan. 22, 1985

[54] PROCESS FOR IMPROVING VERTICAL CONFORMANCE IN A NEAR WELL BORE ENVIRONMENT

[75] Inventor: Robert D. Sydansk, Littleton, Colo.

[73] Assignee: Marathon Oil Company, Findlay, Ohio

[21] Appl. No.: 496,349

[22] Filed: May 19, 1983

[51] Int. Cl.³ .................. E21B 33/138; E21B 43/22
[52] U.S. Cl. .................. 166/295; 166/270; 166/273
[58] Field of Search .......... 166/295, 294, 281, 270, 166/291; 523/130

[56] References Cited

U.S. PATENT DOCUMENTS

| | | | |
|---|---|---|---|
| 3,421,584 | 1/1969 | Eilers et al. | 166/295 |
| 3,718,189 | 2/1973 | Terry | 166/295 X |
| 3,765,484 | 10/1973 | Hamby, Jr. et al. | 166/295 X |
| 3,785,437 | 1/1974 | Clampitt et al. | 166/295 X |
| 3,909,423 | 9/1975 | Hessert et al. | 166/270 X |
| 4,009,755 | 3/1977 | Sandiford | 166/270 |
| 4,120,361 | 10/1978 | Threlkeld et al. | 166/270 X |
| 4,147,211 | 4/1979 | Sandiford | 166/294 X |
| 4,304,301 | 12/1981 | Sydansk | 166/292 |
| 4,332,297 | 6/1982 | Sandiford | 166/270 |
| 4,413,680 | 11/1983 | Sandiford | 166/270 |

Primary Examiner—Stephen J. Novosad
Attorney, Agent, or Firm—Jack L. Hummel; Rodney F. Brown

[57] ABSTRACT

An aqueous solution containing a high molecular weight organic polymer and an aqueous solution containing a cross-linking agent are sequentially injected into the near well bore environment of a subterranean formation interposed by a hydrocarbon spacer. The spacer causes the two aqueous solutions to mix in the near well bore environment and a gel is formed which preferentially plugs the relatively highly permeable zones in the near well bore environment thereby improving conformance and flow profiles of fluids subsequently injected into or produced from the formation.

15 Claims, 1 Drawing Figure

MOBILITY REDUCTION vs. TIME AND VOLUME OF SEQUENTIALLY INJECTED FLUIDS

PROCESS FOR IMPROVING VERTICAL CONFORMANCE IN A NEAR WELL BORE ENVIRONMENT

DESCRIPTION

1. Technical Field

The invention relates to process for improving vertical conformance and flow profiles in a subterranean formation, and more particularly, to a process for reducing permeability in relatively highly permeable zones of a near well bore environment within a subterranean hydrocarbon-bearing formation.

2. Background Art

Poor vertical conformance is the vertical juxtaposition of relatively highly permeable geologic zones to relatively low permeability zones within a subterranean formation. Fluids injected into or produced from a subterranean formation having poor vertical conformance generally exhibit poor flow profiles and vertical sweep efficiencies. Poor vertical conformance is particularly a problem where vertical heterogeneity occurs in close proximity to the subterranean well bore, across which fluids are injected or produced, i.e. the near well bore environment. Fluids injected via a well into a vertically heterogeneous subterranean hydrocarbon-bearing formation tend to preferentially channel into the zones of relatively high permeability. As a result, a relatively high residual hydrocarbon content remains in the zones of relatively low permeability.

Several processes have been proposed to alleviate such preferential channeling. Fluid systems containing a polymer and a cross-linking agent have been injected into a subterranean hydrocarbon-bearing formation to improve the conformance of the formation and to improve flow profiles of subsequently injected and produced fluids. The polymer is cross-linked in situ by the cross-linking agent to form a conformance controlling gel. However, it is necessary to prevent polymer gelation until the fluid system is in place in the formation. U.S. Pat. No. 4,009,755 to Sandiford teaches sequential injection of a polymer and a cross-linking agent separated by an aqueous spacer. Mixing of the fluids and gelation does not occur until the injected fluids are a substantial distance from the near well bore causing some conformance improvement in the far well bore environment, but very little in the near well bore environment. This process results in minimal improvement to overall flow profiles and sweep efficiencies throughout the formation, because the radial flow of the fluids injected into or produced across a well bore is predominantly influenced by the near well bore environment.

Other processes inject a fluid system containing a polymer, a cross-linking agent and a redox reagent into a formation. The cross-linking agent, a polyvalent cation such as chromate, is injected into the formation at a high oxidation state. Gelation of the polymer is delayed until the chromate is reduced in situ to a lower oxidation state by the slow-acting redox reagent. Still other processes teach in situ gelation by injecting a polymer with a sequestered cross-linking agent. A cross-linking agent such as aluminum, which is initially sequestered in a citrate complex, is freed from the complex in situ and thereafter cross links the polymer. The cross-linking systems described above, which require an in situ intermediate reaction before the cross-linking agent is capable of cross linking the polymer, are highly sensitive to formation conditions. Oftentimes the cross-linking systems are not adaptable to specific formation conditions and therefore are generally ineffective.

U.S. Pat. No. 4,304,301 to Sydansk teaches a process for reducing the permeability of highly permeable zones in the near well bore environment. The permeability reducing composition is an insoluble inorganic precipitate. Aqueous caustic followed by a hydrocarbon spacer and a polyvalent cation solution is sequentially injected into the near well bore environment where the solutions mix to form a precipitate. The precipitate forms a separate solid phase in the aqueous solution so that a two phase mixture resides in the near well bore environment. Only the precipitate acts as an impediment to fluid flow. The precipitate either partially or almost completely plugs the relatively highly permeable zones, depending on the initial concentration of reactants. As such, the precipitate does not form a continuous single phase plug in the highly permeable zones of the near well bore environment.

A need exists for a process which effectively substantially shuts off or plugs the relatively highly permeable zones in the near well bore environment of a subterranean formation to improve vertical conformance therein. A need exists for a process, which correspondingly improves flow profiles and sweep efficiencies of injected or produced fluids throughout the formation. More particularly a process is needed, which provides a permanent continuous single phase plug in the relatively highly permeable zones of the near well bore environment. A plug is needed which readily sets up in situ under a range of formation conditions and is not susceptible to substantial in situ degradation.

DISCLOSURE OF INVENTION

The present invention provides a process for improving vertical conformance in the near well bore environment of a subterranean hydrocarbon-bearing formation and correspondingly improving flow profiles of injected and produced fluids in both the near and far well bore environments. The near well bore environment contains zones of relatively high and low permeabilities, which are penetrated by a well. An aqueous solution containing a high molecular weight organic polymer and an aqueous solution containing a cross-linking agent, which are separated by a hydrocarbon spacer, are sequentially injected into the relatively highly permeable zones of the near well bore environment where the two solutions preferentially mix. Upon mixing, the solutions readily form a continuous single phase gel in situ. The gel substantially shuts off or plugs the relatively high permeable zones. The gel plug is substantially permanent and not susceptible to in situ degradation.

The process is particularly effective where the near well bore environment, wherein conformance is to be controlled, contains zones of relatively high and low permeabilities, which are separated by one or more relatively impermeable zones such that the permeable zones are not in fluid communication with one another. Zone isolation, achieved by means such as downhole packers, directs entry of the injected gel forming solutions only into the relatively highly permeable zones of the near well bore environment. Because the heterogeneous zones are non-communicating, virtually none of the injected solutions migrate into the relatively less permeable zones, thereby maintaining the permeability of these zones while substantially shutting off the relatively highly permeable zones. After substantial shut off of the relatively highly permeable zones in the near well bore environment, the packers are removed so that fluids may be injected into or produced from the relatively low permeability, hydrocarbon-bearing zones for improved recovery of the hydrocarbons therein.

BEST MODE FOR CARRYING OUT THE INVENTION

Figure 1:
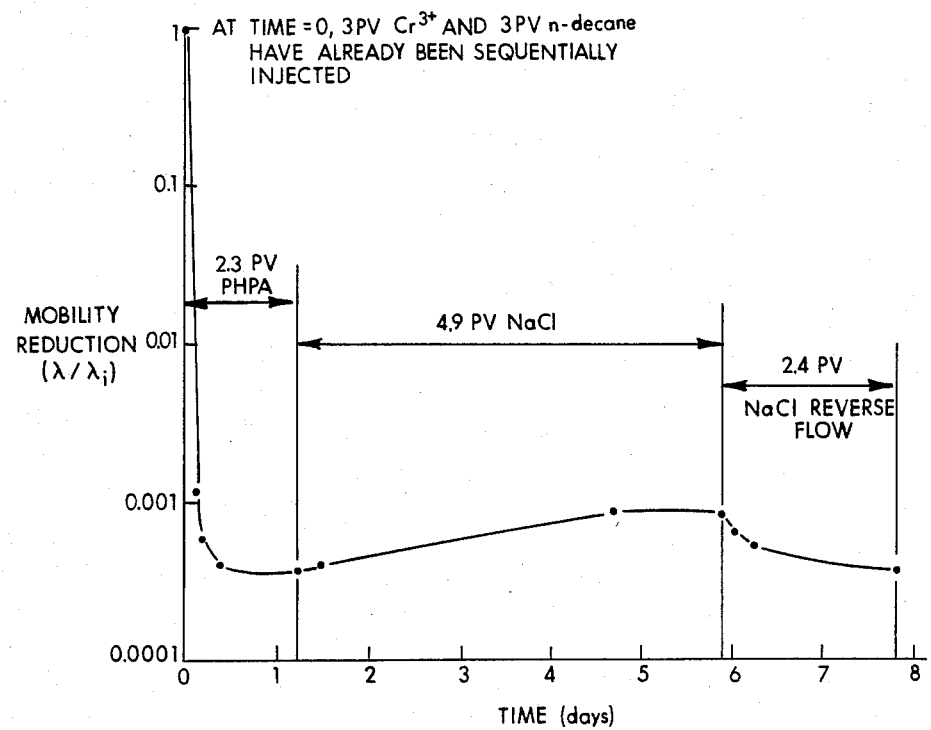
FIG. 1 is a graphical representation of the amount of mobility reduction obtained in the near well bore environment of a subterranean formation by the process of the present invention as a function of time as well as species and volume of injected fluids. Mobility reduction is directly correlated to permeability reduction.

The present invention relates to a process for improving vertical conformance in the near well bore environment of a subterranean hydrocarbon-bearing formation and correspondingly improving flow profiles throughout the formation of injected or produced fluids. To clarify certain terms as utilized throughout this description, they are defined as follows. "Vertical conformance" is the degree of geologic uniformity in permeability as one moves vertically across the formation zones. A "zone" is a subterranean stratum extending radially in a substantially horizontal direction from the well bore, which has continuous geological properties. A "flow profile" qualitatively describes fluid flow through a subterranean formation while "sweep efficiency" is the quantitative analog of "flow profile". "Near well bore environment" denotes the volume surrounding a well bore penetrating a subterranean formation wherein fluids exhibit relatively homogeneous horizontal flow characteristics and mixing between sequentially injected fluids separated by an aqueous spacer does not readily occur to any substantial degree. Such mixing is dependent upon, inter alia, the volume of the aqueous spacer, the characteristics of the formation (e.g. the number of pore channels present in the formation, the permeability of the formation, the degree of homogeneity of the formation, and the geometry of the pores and pore throats of the formation), the characteristics of each injected fluid (e.g. the diffusion characteristics of each fluid, the viscosity of each fluid, the concentrations of reactive species in each fluid, and the relative mobilities of each injected fluid), and the injection rates of each injected fluid. Given such dependency, the degree of mixing which will occur at a desired distance from a well bore penetrating a formation can be determined by the skilled artisan. As a general guide, the near well bore environment usually extends a radial distance into the formation of up to about 3 meters from the well bore and may extend up to about 9 meters or more.

The process of the present invention comprises the sequential injection of two aqueous solutions, each of which contains a separate reactive species. One species cross links the other upon mixing to produce a continuous gel. More specifically, the process involves the sequential injection of a first aqueous solution containing a reactive high molecular weight organic polymer, a hydrocarbon spacer, and a second aqueous solution containing a reactive cross-linking agent. The order in which the aqueous solutions are injected is not critical so long as the aqueous solutions containing the reactive species are separated by a hydrocarbon spacer during injection.

It has been unexpectedly discovered that the inclusion of a hydrocarbon spacer between an aqueous solution containing a high molecular weight organic polymer and a sequentially injected aqueous solution containing a dissolved polyvalent cation cross-linking agent causes effective mixing of the two aqueous solutions in the near well bore environment. Such mixing results in the formation of an organic gel. The gel is a non-flowing, rigid or nearly rigid, continuous single phase composition resulting from the cross linking of the high molecular weight organic polymers by the polyvalent cations. The gel substantially shuts off fluid flow in zones of relatively high permeability in the near well bore environment. This results in improved conformance in the near well bore environment and improved flow profiles for fluids injected into or produced from the formation.

While it is not completely understood exactly why the process of the present invention results in formation of a gel in the near well bore environment, it is believed that the hydrocarbon spacer traps a portion of the initially injected aqueous solution containing a dissolved reactive species within the residual and immobile water phase in each pore of that portion of the formation into which the aqueous solution has been injected. Subsequent injection of an aqueous solution containing a second dissolved reactive species results in the cross linking of polymers by polyvalent cations within each pore to form the gel.

The organic polymer utilized in the injected aqueous solution may be any high molecular weight natural or synthetic organic polymer capable of being cross linked by polyvalent cations. Examples of natural biopolymers which may be used include xanthan gums, hydroxyethylcellulose, polysaccharides or modified polysaccharides. Synthetic organic polymers which may be used are those containing carboxylate groups. Partially hydrolyzed polyacrylamide (PHPA) is the preferred polymer. The degree to which the polyacrylamide is hydrolyzed is not critical. From about 1 to about 60 percent of the acrylamide groups may be hydrolyzed, although the preferred range of hydrolysis is from about 10 to about 40 percent. The molecular weight of the polymer is in the range of from about 10,000 to about 50,000,000. The hydrocarbon employed as the hydrocarbon spacer may be any hydrocarbon which is liquid at formation conditions and which does not react to any substantial degree with the polymer or polyvalent cations. The hydrocarbon can be an alkene, alkane, aromatic or a mixture thereof. Examples of hydrocarbons which may be used in the present invention include gasoline, kerosene, diesel fuel and heating oil. The polyvalent cation cross-linking agent must be a cation with a positive charge of three or more, which is water soluble and capable of cross linking the polymer. Examples of such ions include chromium, aluminum or iron. Aluminum ion is the preferred polyvalent cation cross-linking agent because of its relatively low cost. The polyvalent cation can be incorporated into the solution as a salt, such as aluminum sulfate.

The relative amounts of polymer and cross-linking agent employed are dictated by the stoichiometry of the cross-linking reaction and the geology of the formation. Stoichiometrically one trivalent cation is capable of reacting with three carboxylate sites on one or more partially hydrolyzed acrylamide polymers. However, when producing a stable polymer gel, it is often undesirable to cross link every available carboxylate site. Thus only a fraction of the total number of carboxylate sites should be cross linked. It is also important to consider when determining the relative amounts of polymer and cations to be injected that a certain number of the injected cations become unavailable to react with the polymer, because they are absorbed on or react with the reservoir rock. The skilled artisan can readily determine the relative concentrations of cations and polymer to be injected based on the stoichiometry of the cross-linking reaction and the type of rock present in the formation. Generally, where few polyvalent cations are lost to the rock, the gel components are injected in non-stoichiometric amounts such that the equivalents of carboxylate groups on the polymer are in excess of the equivalents of reactive polyvalent cations.

The concentration of polymer in the injected solution is constrained at the upper limit by the solubility limit of the polymer in water and the maximum injectable viscosity of the polymer solution. The lower concentration limit is about 100 ppm, which is the lowest concentration at which an effective, but weak, gel will form. The most preferred concentration of polymer in the injected solution is from about 500 to about 5000 ppm. The concentration of trivalent cation may be anywhere from about 50 ppm to about 20 percent by weight and is dependent on carboxylate concentration and the type of rock present in the formation as noted above. Any aqueous medium, which is compatible with the polymer and polyvalent cation, may be used as the solvent for the injected solutions. Generally a typical field brine is a satisfactory solvent. However, it should not contain a relatively large concentration of divalent cations nor a significant concentration of trivalent cations.

Inert additives can be added to the polymer solution, which are incorporated into the network structure of the gel plug. The additives are non-reactive and may be either inorganic or organic materials. Exemplary inorganic solid additives include silica, i.e. silicon dioxide or hydrated silicon dioxide, or aluminosilicates, i.e. silicate rock materials. Examples of organic additives are solids, such as latex balls and ground resins, or polymers, such as nonionic polyethylene oxide. The additives are enveloped in the network structure of the gel when cross linking occurs. They act as inert filler materials, which increase the structural strength of the gel, although they are not chemically linked to the polymer. The gels alone may not be strong enough to plug very high permeability anomalies in a formation, but by adding an additive such as those described above to the gel, the present process can be used to plug such very high permeability anomalies.

The volume of the aqueous solution initially injected is dictated by the pore volume and volume of residual oil in those portions of the near well bore desired to be treated. The volume of the solution initially injected is approximately equal to or greater than the pore volume of the highly permeable zones of the near well bore environment to be treated minus the volume of the residual oil in place in those zones. The volume of the initially injected solution is critical, since the injected solution must substantially displace the mobile water phase from the relatively highly permeable zones in the near well bore environment to achieve substantial plugging thereof. The volume of hydrocarbon spacer injected is not critical, so long as it is sufficient to prevent mixing of the aqueous solutions in the tubing and at the well bore. The preferred volume of hydrocarbon injected is approximately equal to the volume of initially injected solution.

By utilizing the process of the present invention, selected zones of the near well bore environment of a subterranean hydrocarbon-bearing formation can be substantially plugged resulting in complete or nearly complete shutoff of the treated zones. The process is preferentially employed to improve vertical conformance in the near well bore environment of a subterranean hydrocarbon-bearing formation utilizing mechanical zone isolation, i.e. isolating selected relatively highly permeable zones of a formation at the well bore utilizing conventional packer assemblies and selectively treating these highly permeable zones.

It is also important to note that the plugging of these selected zones is substantially irreversible. Once the gel is in place in the formation, it is extremely difficult to displace the gel by physical or chemical means.

The process can be applied to formations having widely varying temperatures and mineralogy, and is insensitive to the volume of hydrocarbon spacer injected. Also multiple applications of the sequential injection may be used to achieve substantial shutoff of the relatively highly permeable zones. Although the present invention has been described as a process involving the sequential injection of two aqueous solutions containing dissolved reactants interposed with a hydrocarbon spacer, the hydrocarbon spacer can be initially introduced into the near well bore environment, followed by polymer injection where the formation connate water contains polyvalent cations in a sufficient concentration to cross link the polymer and form a stable gel.

The following examples are illustrative of the application of the process of the present invention using zone isolation and are not to be construed as limiting the scope thereof.

EXAMPLE 1

A 3.8 cm×2.5 cm diameter fired Berea sandstone plug initially having a permeability of 620 md and at residual oil saturation ($S_{or}$) with 1 wt % NaCl and n-decane is sequentially injected at room temperature, 22° C., with 3 pore volumes (PV) of 8000 ppm $Cr(NO_3)_3 \cdot 9H_2O$, 3 PV of n-decane spacer and 2.3 PV of 5000 ppm partially hydrolyzed polyacrylamide (PHPA) in a 0.65 wt % NaCl solution. The PHPA has a molecular weight of 5,000,000 and is 30% hydrolyzed. Mobility reduction ($\lambda/\lambda_i$) is about 0.0004 after completion of PHPA injection. 4.9 PV of 1 wt % NaCl solution is then injected over four days raising mobility reduction to about 0.0008. An additional 2.4 PV of 1 wt % NaCl solution is injected at reverse flow over two days and the mobility reduction is restored to about 0.0004. The results are shown below in Table 1 and graphically in FIG. 1.

TABLE 1

|  | Pore Volumes Injected | Mobility Reduction ($\lambda/\lambda_i$) |
| --- | --- | --- |
| 8000 ppm $Cr(NO_3)_3 \cdot 9H_2O$ | 3 | — |
| n-decane | 3 | — |
| 5000 ppm PHPA in 0.65 wt % NaCl | 2.3 | 0.0004 |
| 1% NaCl | 4.9 | 0.0008 |
| 1% NaCl reverse flow | 2.4 | 0.0004 |

Practice of the instant invention in Example 1 produces a mobility reduction of greater than three orders of magnitude in the Berea plug. Reduced mobility indicates a corresponding reduction in permeability of the rock. The permeability is not substantially increased by continued flooding of the plug with a brine after the gel is in place, which is demonstrative of the stability and permanence of the gel.

EXAMPLE 2

100 cm$^3$ of 20 to 30 mesh Ottawa test sand is placed in a 250 cm$^3$ glass burette and rendered to $S_{or}$ with tap water and n-decane. The sand pack has a permeability of about 10 darcies at $S_{or}$. The sand pack is injected with $Cr(NO_3)_3.9H_2O$, n-decane and PHPA in an NaCl solution as in the first sequence of Example 1. The injection sequence is then repeated resulting in near-quantitative shutoff of the sand pack's permeability. The permeability remains nearly constant after several days.

EXAMPLE 3

Three 100 cm$^3$ slugs are sequentially injected into the virgin sand pack of Example 2. The slugs are (1) $Al_2(SO_4)_3.16H_2O$ solution with an $Al^{3+}$ concentration of 690 ppm, (2) n-decane and (3) PHPA in an NaCl solution as in Example 1. Three 50 cm$^3$ slugs, the first water, the second n-decane and the third water, are then sequentially injected followed by a repeat sequence of 50 cm$^3$ slugs of $Al_2(SO_4)_3.16H_2O$, n-decane and PHPA as characterized above. The final permeability ($k_f$) of the sand pack is 0.0083 darcies and $k_f/k_i$ is about 0.0008. The permeability remains nearly constant after several days of additional testing.

EXAMPLE 4

100 cm$^3$ of 5 mm diameter glass beads with a calculated permeability of 9000 darcies is placed in the glass burette of Example 2. Five separate slugs characterized as follows: (1) 100 cm$^3$ of a mixture containing 10 parts per volume of the PHPA in an NaCl solution as in Example 1, 1 part sand (about 35 mesh), 0.3 parts sand (20–30 mesh) and 1 part silica gel (20–200 mesh); (2) 50 cm$^3$ of n-decane; (3) 50 cm$^3$ of 690 ppm $Al^{3+}$ ion as $Al_2(SO_4)_3.16H_2O$; (4) 50 cm$^3$ of n-decane; and (5) 20 cm$^3$ of PHPA in an NaCl solution as in Example 1 are sequentially injected into the glass bead pack. $k_f$ is about 0.2 darcies and $k_f/k_i$ is less than 0.0001. No flow can be detected after 24 hours.

Examples 2 and 3 demonstrate the effectiveness of the process for substantially shutting off or plugging a permeable structure using repeated sequential injections of the reactive components and spacer. Example 4 shows the ability of the process to substantially shut off very high permeability anomalies in a geological structure by incorporating inert silica into the gel plug.

Although the present invention has been described as a process for treating and improving vertical conformance in the near well bore environment, the process of the present invention correspondingly improves flow profiles and sweep efficiencies of fluids injected into and produced from the near and distant well bore alike, as will be evident to the skilled artisan. The invention can be used to improve flow profiles and sweep efficiencies in the formation when applied to either injection or production wells.

While the foregoing preferred embodiment of the invention has been described and shown, it is understood that the alternatives and modifications, such as those suggested, and others may be made thereto and fall within the scope of the invention.

What is claimed is:

1. A process for substantially plugging at least one zone of relatively high permeability in a near well bore environment of a subterranean formation penetrated by a well bore in fluid communication therewith, said formation having said at least one zone of relatively high permeability and at least one zone of relatively low permeability, the process comprising the steps of:
   (a) injecting an aqueous solution containing an organic polymer capable of being cross linked by a cross-linking agent into said near well bore environment via said well bore;
   (b) injecting a hydrocarbon spacer between said solution containing said polymer and an aqueous solution containing said cross-linking agent into said near well bore environment via said well bore in an amount sufficient to delay mixing of said solutions containing said polymer and said cross-linking agent until said solutions are in said near well bore environment;
   (c) injecting said solution containing said cross-linking agent into said near well bore environment via said well bore; and
   (d) reacting said polymer and said cross-linking agent upon said mixing to form a gel preferentially and predominantly within said at least one zone of relatively high permeability in said near well bore environment, which substantially plugs said at least one zone of relatively high permeability in said near well bore environment.

2. The process of claim 1 wherein said organic polymer is partially hydrolyzed polyacrylamide.

3. The process of claim 1 wherein said organic polymer is a biopolymer.

4. The process of claim 1 wherein said cross-linking agent is a polyvalent cation.

5. The process of claim 4 wherein said polyvalent cation is a trivalent cation selected from the group consisting of ions of chromium, iron, and aluminum.

6. The process of claim 1 wherein said acrylamide solution containing said organic polymer also contains an inert additive.

7. The process of claim 6 wherein said inert additive is selected from the group consisting of silicas and silicates.

8. The process of claim 1 wherein said liquid hydrocarbon spacer is unreactive with said organic polymer and said cross-linking agent.

9. The process of claim 8 wherein said hydrocarbon spacer is selected from the group consisting of alkanes, alkenes, aromatics and mixtures thereof.

10. The process of claim 1 wherein at least one zone of relatively high permeability is isolated by a mechanical zone isolation means prior to injecting said aqueous solutions and hydrocarbon spacer.

11. The process of claim 10 wherein said at least one zone of relatively high permeability is not in fluid communication with said at least one zone of relatively low permeability.

12. The process of claim 1 wherein said zone of relatively high permeability is vertically juxtaposed to said zone of relatively low permeability.

13. The process of claim 1 wherein the injection sequence of steps (a), (b) and (c) is repeated at least once.

14. The process of claim 13 wherein said hydrocarbon spacer is injected into said near well bore environment between each repetition of said injection sequence.

15. The process of claim 1 wherein said subterranean formation is a subterranean hydrocarbon-bearing formation.

* * * * *

UNITED STATES PATENT AND TRADEMARK OFFICE
CERTIFICATE OF CORRECTION

PATENT NO. : 4,494,606
DATED : January 22, 1985
INVENTOR(S) : Robert D. Sydansk

It is certified that error appears in the above-identified patent and that said Letters Patent are hereby corrected as shown below:

Col. 5, line 8: Delete "absorbed" and insert --adsorbed--.
Col. 7, line 40: Delete "20-200" and insert --28-200--.
Col. 8, line 49: After "wherein" insert --said--.

Signed and Sealed this

Second Day of July 1985

[SEAL]

Attest:

DONALD J. QUIGG

*Attesting Officer*    *Acting Commissioner of Patents and Trademarks*